Sept. 18, 1962 A. W. PELLETT 3,054,343
COMPRESSING APPARATUS
Filed June 26, 1959
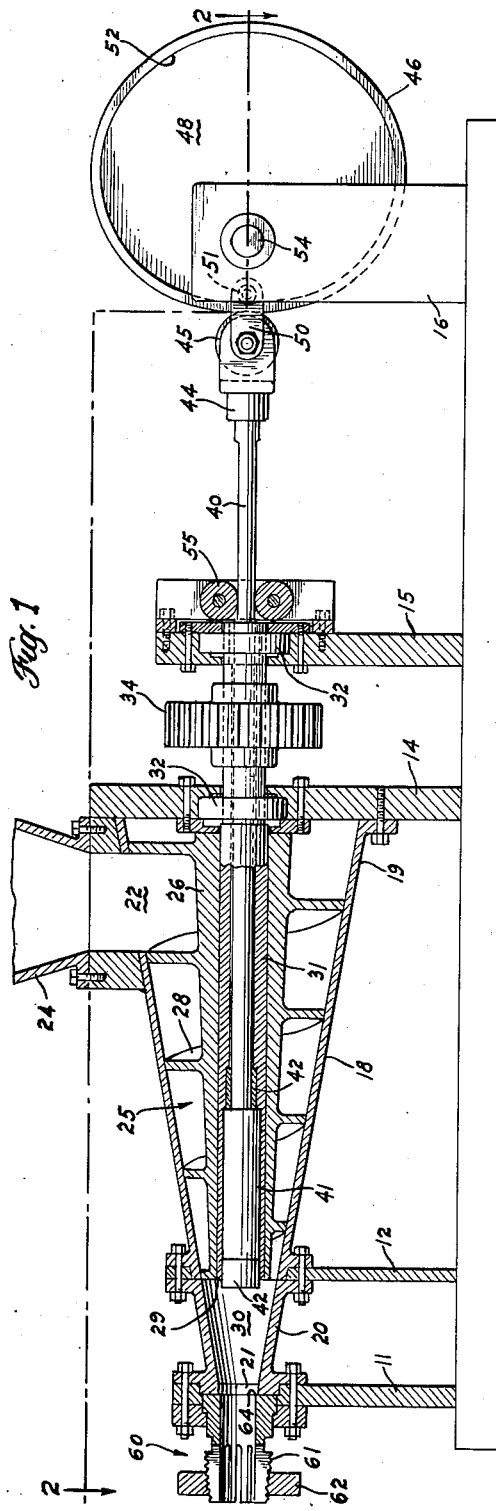
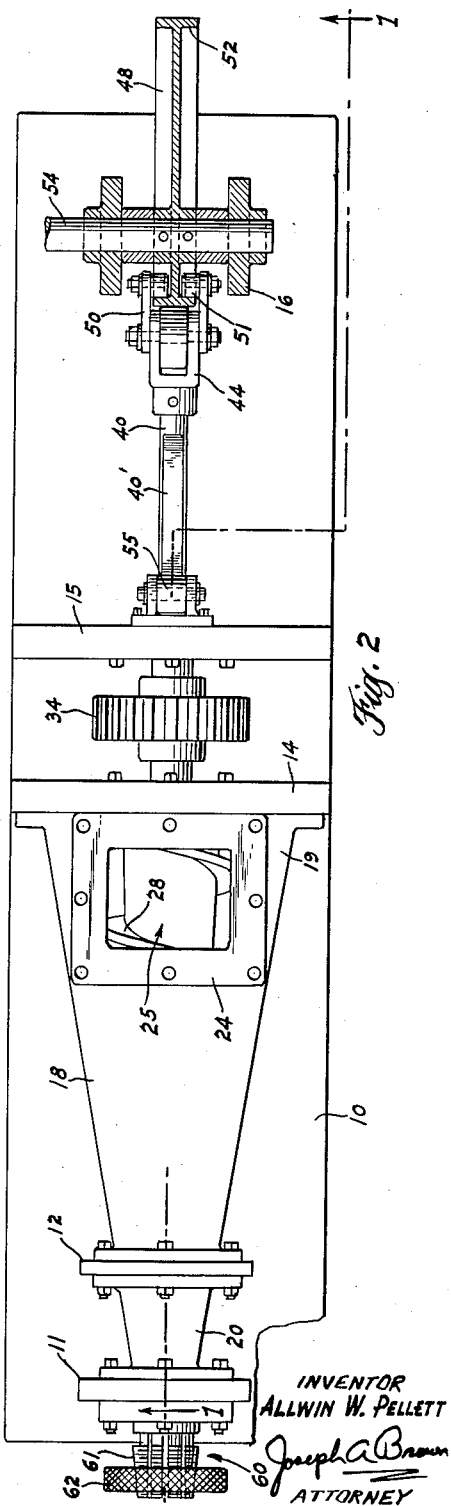
INVENTOR
ALLWIN W. PELLETT
Joseph A. Brown
ATTORNEY 3,054,343
COMPRESSING APPARATUS
Allwin W. Pellett, Honey Brook, Pa., assignor to Sperry Rand Corporation, New Holland, Pa., a corporation of Delaware
Filed June 26, 1959, Ser. No. 823,095
1 Claim. (Cl. 100—148)

This invention relates to machines for forming crop material into pellets.

If crop material is compressed in small units to a greater degree than that used in baling, such as three or four times as much, the hay will bind together and will not have to be tied. It has been found that even though crop material is compressed to an extent that it does not have to be secured with a tying medium, the compressed material can be fed to animals as feed. The animals are able to break apart the pellets and consume them. Pelleting machines are presently available which form crop material into pellets. However, such machines are generally large, cumbersome implements which grind the hay to place it into suitable condition for forming it into very small pellet sized pieces. Grinding the hay reduces its food value and has other disadvantages.

An important object of this invention is to provide a machine which will operate to form crop material into pellets, there being no pre-grinding or other treatment of the crop before it is pelletized.

Another object of this invention is to provide a machine which will accomplish the foregoing object with a structure which is relatively simple and inexpensive.

Another object of this invention is to provide a pelleting machine which conveys the crop material in a straight line when it is being pelletized.

Other objects of this invention will be apparent hereinafter from the specification and from the recital in the appended claim.

In the drawing:

FIG. 1 is a part vertical section part side elevation of a pelleting machine constructed according to this invention. Such view is taken on the lines 1—1 of FIG. 2 looking in the direction of the arrows; and FIG. 2 is a plan view of the pelleter taken on the lines 2—2 of FIG. 1 and showing a portion of the drive means therefor in horizontal section.

Referring now to the drawing by numerals of reference, 10 denotes a base member having upright supports 11, 12, 14, 15 and 16. Mounted on supports 11, 12 and 14 is a funnel-shaped impervious compression chamber 18 having a larger end 19 connected to the support 14 and a smaller end 20 connected to the supports 11 and 12. The longitudinal axis of the chamber 18 extends parallel to the base 10. Chamber 18 has an outlet opening 21 at its smaller end and an inlet opening 22 in the top thereof adjacent the larger end. Mounted on top of chamber 18 is a hopper 24 open at its bottom and communicating with the opening 22. Thus, it will be apparent that crop material dumped into the hopper 24 will fall by gravity into the chamber 18.

Rotatable in chamber 18 is a compression auger 25 having a shaft 26 and helical flights 28. As shown in FIG. 1, the size of opening 22 is equal to the distance between the auger flights adjacent the inlet. Shaft 26 is tapered, having an outside diameter which decreases from the larger end of chamber 18 toward the smaller end thereof. The discharge end 29 of the auger terminates at a point spaced from the discharge opening 21. Between the discharge end of the auger and the discharge opening 21 there is provided a chamber 30.

The shaft 26 of the auger 25 has a tube 31 connected to it which projects outwardly of the chamber 18 and is carried on a pair of relatively spaced bearings 32 mounted on supports 14 and 15. Keyed to tube 31 is a drive gear 34 which can be driven from any suitable source of power, not shown, to rotate the auger. The gear 34 is adapted to drive the auger 25 so that material admitted to the chamber 18 through the hopper 24 is conveyed by the auger 25 towards the outlet 21.

Extending through auger 25 and reciprocable in the tube 31 is a shaft 40 having a piston 41 at one end thereof. Piston 41 has a cap 42 at its outer end which is hardened. The piston and cap are reciprocable in tube 31 and guided by means including a lubricated bushing 42.

At the end of shaft 40 opposite the piston 41 there is provided a clevis-like member 44 which carries a follower 45 cooperative with the periphery 46 of a cam 48. Projecting rearwardly of member 44 are arms 50 which carry rollers 51 operative against the inner cam face 52 of the cam 48. The cam is supported on and rotated by a shaft 54 journalled in support 16. The shaft 54 is driven from a source of power, not shown. It will be apparent that when the cam 48 rotates, the peripheral cam surface 46 will operate against follower 45 to drive the rod 40 to the left and, at the end of a working stroke, the rollers 51 engaging the inner surfaces 52 of the cam will cause the rod to be retracted. Therefore, cam 48 provides a double action.

The support 15 carries a pair of rollers 55 rotatable about horizontal axes and through which the rod 40 projects. These rollers engage flats 40' on rod 40 and prevent the rod from rotating when reciprocated.

Mounted on support 11 and adapted to receive material as it comes through the discharge opening 21 is a choke 60 having a plurality of resilient fingers 61 having tapered peripheral portions threaded as shown and provided with an adjusting ring 62 whereby the effective internal opening of the choke can be varied as desired.

In operation, the operator feeds material into the mechanism through the hopper 24. The material drops by gravity from the hopper into the chamber 18 whereupon the auger 25 engages and conveys it toward the outlet opening 21. As the material is conveyed, it is precompressed, ultimately being discharged from the discharge end 29 of the auger and into the chamber 30. The material is forced from the chamber 30 by the piston 41. The cap 42 is projected into the opening 21 and into the inner end of the choke 60. Such inner end is provided with a shearing edge 64 so that the crop material is cut off and separated from the other material in chamber 30 to form a separate pellet unit with each working stroke of the piston. When the piston 41 is retracted, the auger is able to convey additional material into the chamber 30 whereupon with the next working stroke of the piston, a subsequent pellet is formed. Previously formed pellets are discharged from the choke 60 by pellets following. The operator may adjust the choke 60 using the ring 62 to regulate the operation of the machine.

As shown in FIG. 1, when the piston 41 is retracted, the cap 42 projects somewhat into the chamber 30. This is done so that as the material is discharged from the auger, it curves around the working end of the piston and assumes its proper position for movement toward the discharge opening 21. This minimizes any change of direction of material as it moves from the auger to the opening 21.

The apparatus is adapted to operate on crop material in natural form. The crop material does not have to be ground up before it is fed into the apparatus. However, this may be done if desired. The tapering of the chamber 18 and the operation of the auger 25, followed by the piston 41, causes the formation of a pellet in progressive stages. Once the material is in the chamber 18 it moves in a straight line through its pre-compression stage by the auger 25 to its final compression stage by the piston 41.

Since the direction of movement of the crop material is linear, the mechanism is simplified and operates more effectively and efficiently.

While this invention has been described in connection with a particular embodiment thereof, it will be understood that it is capable of further modification and this application is intended to cover any variations, uses or adaptations of the invention following in general, the principles of this invention and including such departures as come within known or customary practice in the art to which the invention pertains and as fall within the scope of the invention or the limits of the appended claim.

Having thus described my invention, what I claim is:

A pelleter for hay and other crop material comprising a compression chamber having an inlet at one end, an outlet at an opposite end and an impervious wall therebetween, an auger rotatable in said chamber and having a crop receiving end adjacent said inlet and a discharge end spaced from said outlet thereby forming a reception area within said chamber, said chamber and the auger therein being tapered at a substantial angle and converging from said one end to said opposite end and having close engagement with each other whereby material conveyed by the auger is highly compressed as it moves toward said reception chamber and outlet and is prevented from escaping toward said inlet, said auger having a shaft and helical flights thereon which extend substantially the axial length of the shaft, a piston reciprocable in said shaft and having a head at one end movable back and forth from a retracted position adjacent said auger discharge end to an extended position at said outlet to thereby force material delivered by said auger through said outlet, said head when in said retracted position extending beyond said discharge end of the auger and short of said outlet, an expandable and contractable choke connected to said opposite end of said compression chamber to receive material from said outlet, said choke having a shearing edge at an end adjacent said chamber and into which said piston head projects when in extended position, the size of said piston head being such relative to the size of said choke that material forced into the choke is severed on passing said shearing edge, said piston having an end opposite said one end projecting exteriorly of said compression chamber adjacent said inlet end, and means connected to said projecting end for reciprocating said piston.

References Cited in the file of this patent

UNITED STATES PATENTS

| | | |
|---|---|---|
| 1,653,831 | Archidiacano | Dec. 27, 1927 |
| 2,296,516 | Goss | Sept. 22, 1942 |
| 2,629,132 | Willcox et al. | Feb. 24, 1953 |
| 2,704,380 | Cuzzi | Mar. 22, 1955 |

FOREIGN PATENTS

| | | |
|---|---|---|
| 61,101 | Denmark | June 21, 1943 |
| 16,309 | Great Britain | July 14, 1911 |